United States Patent [19]

Madole et al.

[11] 3,917,529
[45] Nov. 4, 1975

[54] PROCESS FOR THE DESTABILIZATION AND SEPARATION OF ILMENITE (FeO·TiO$_2$) TAILINGS

[75] Inventors: Jim M. Madole, Salt Lake City, Utah; Richard F. Ables, Starke, Fla.

[73] Assignee: Nalco Chemical Company, Oak Brook, Ill.

[22] Filed: July 1, 1974

[21] Appl. No.: 484,955

[52] U.S. Cl. .................................. 210/54; 299/9
[51] Int. Cl.$^2$ .................................. B01D 21/01
[58] Field of Search ............. 210/42, 49, 51, 52–54, 210/59; 299/7, 9

[56] References Cited
UNITED STATES PATENTS

| | | | |
|---|---|---|---|
| 2,926,154 | 2/1960 | Keim | 260/9 |
| 3,493,502 | 2/1970 | Coscia | 210/54 |
| 3,544,456 | 12/1970 | Shanfelf et al. | 210/54 |
| 3,725,312 | 4/1973 | Panzer et al. | 210/54 |
| 3,738,945 | 6/1973 | Panzer et al. | 210/54 |

*Primary Examiner*—Charles N. Hart
*Assistant Examiner*—Peter A. Hruskoci
*Attorney, Agent, or Firm*—John G. Premo; John S. Roberts

[57] ABSTRACT

The separation of humates and silica from sands containing ilmenite (FeO·TiO$_2$) and other heavy metals during ground level dredge mining of FeO·TiO$_2$ from ancient beach sand wherein the tailings as discard contain organic matter, largely humates, as colloidal dispersion, together with a major amount of silica present as a slurry which is forwarded to conduits and piles. This improved process comprises adding to the tailings 6–400 ppm of an organic cationic condensate and particularly a polymeric cationic organic amine. Preferred polymers or condensates are epichlorohydrin (epi)/ammonia and ethylene dichloride/dimethylamine (DMA) quaternized with methyl chloride. The concurrent use of high shear agitation in mixing the cationic condensate with the tailings dispersion as, for example, utilizing the mixture as input to the suction side of a centrifugal pump, allows the amount of cationic treating agent to be drastically reduced from a range of about 240–400 to 6–50 ppm. Further, the incorporation of the treating agents into a type of closed cycle or no-exit process where the tailings are piled up in a contiguous area of the mining operation has definite advantages over prior processes because the colored humate values are now in part or wholly bound to the silica and the return water is clarified. Furthermore, the eventual use of the tailings pile with the bound humate now permits reforestation.

3 Claims, 1 Drawing Figure

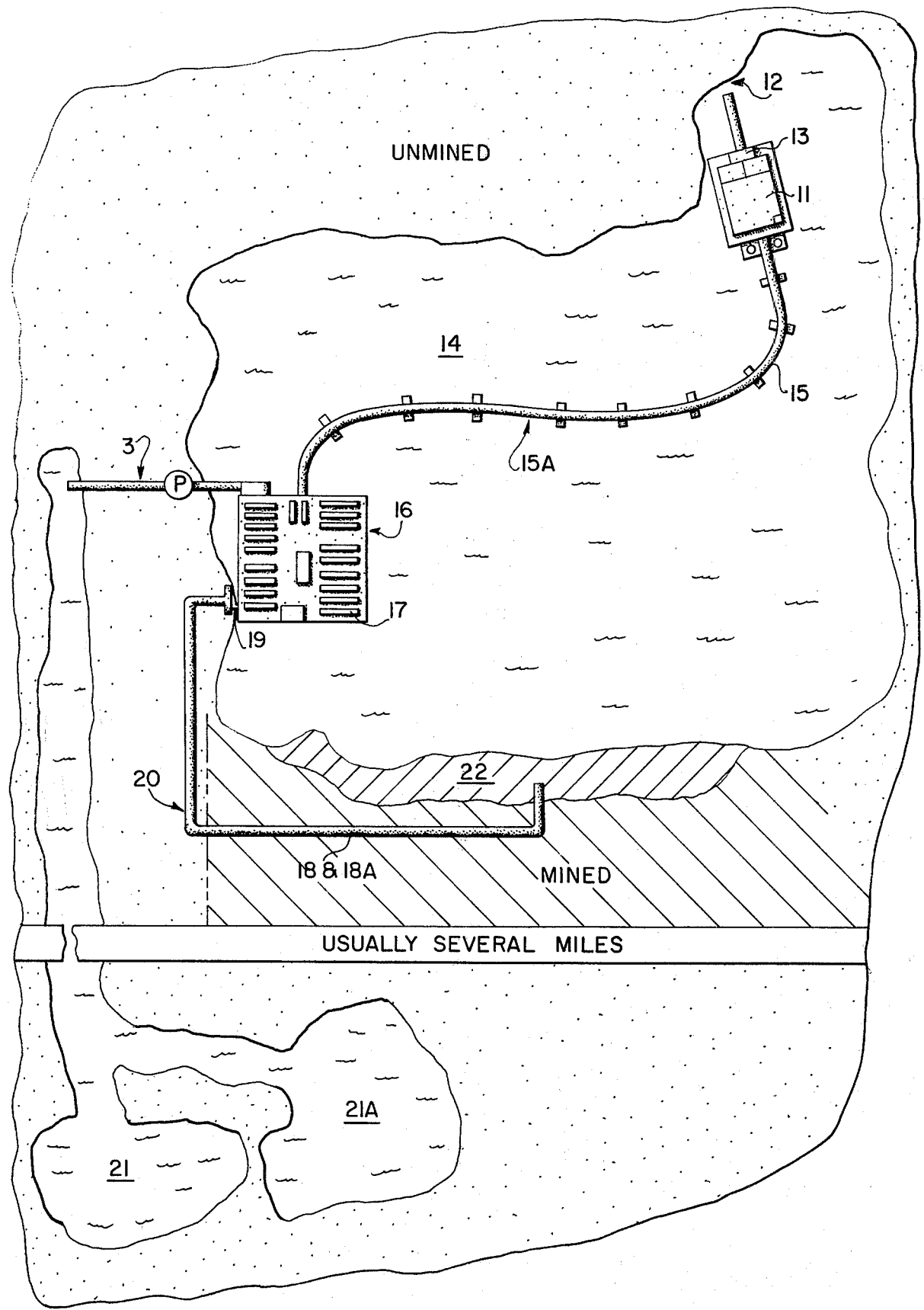

PROCESS FOR THE DESTABILIZATION AND SEPARATION OF ILMENITE (FeO TiO$_2$) TAILINGS

Ilmenite (FeO·TiO$_2$) is a heavy metal oxide which when purified is extremely useful in providing white pigments as TiO$_2$. Today one source of ilmenite if from "ancient beach sands" where the compound is present at ground level or at a level close to the surface which is susceptible to dredge mining. Such areas for ilmenite recovery are prevalent in beaches and parts of Florida and New Jersey.

In a typical mining operation a powered dredge which contains a cutter and pump for removing a sand deposit from beneath the surface of the dredge pond itself and forwarding that sand deposit in the form of an aqueous suspension to a wet mill which may be situated on a separate floating platform or on land and operated nearby. The cutter cuts into the sand deposit below the surface of the water in the dredge pond and the mined material is then forwarded to the wet mill for separation into two fractions. The first fraction, about 4 percent of the total mined material, is in the form of a heavy mineral concentrate composed largely of ilmenite, but it also contains zircon, kyanite and other minerals. For brevity, this is called the ilmenite fraction herein. In any case, the fraction is then forwarded to a so-called dry mill for separation of the individual heavy mineral components. The second, or so-called tailings fraction, is composed largely of silica containing 0.5 to 4% organic solids, largely humates, and this fraction is discarded in an already mined area nearby. The water content thereof gradually sifts through the pile and back to the dredge pond itself. In this respect it will be understood that the water is being constantly recycled to the dredge, to the wet mill and then to the tailings pile where it returns to the pond.

The wet mill takes the entire load of slurry from the dredge for classification. This wet mill takes the slurry which was pumped by the dredge pump and classifies it according to specific gravity to separate the ilmenite fraction from the other materials. The classification is done by conventional spiral classifiers (cf Perry's Chemical Engineering Handbook, 4th Edition, 1963, McGraw-Hill, Chapter 21, page 54) and the nonilmenite fraction from the classifier is termed tailings. The tailings from the wet mill are conveyed to a disposal area immediately behind the mining unit.

In practice, the colored humates with their organic values tend to sift with the water outwardly through the tailings, thereby accumulating in the dredge pond itself, resulting in a substantial increase in humate concentration in the dredge pond. The additional humate concentration in the dredge pond water severely hinders the wet milling operation, necessitating a separate operation in which a portion of the dredge pond water would be separately removed. In the past, the reconstituting of dredge pond water has been done by removal of a portion of the dredge pond water to so-called satellite ponds and replaced by fresh water.

It is an object of the present invention to provide a method of increasing the size of the colloidal humate particles by polymeric binding and re-anchoring said enlarged particles to the silica particles as they were found in nature.

It heretofore has been recognized that mineral acids or alkalis could be used as flocculants with moderate success to similarly increase the size of the colloidal humates to the point where they can be allowed to separate and settle in a satellite pond. These flocculation procedures in the case of alkali treatment are based upon discharging the zeta potential existing between the negatively charged organic particles and in the case of acid forming a complex to achieve the same results. The advantage of the instant process is the disposal of the humates in the tailings pile and allow the disposal without the need for settling ponds. Settling takes 5 to 8 years before it can be used. Our way is essentially instant reclassification.

PRIOR ART

Patented prior art believed to be pertinent to one or more aspects of this invention is as follows:
- U.S. Pat. No. Re. 27,275 DaJani (Nalco), Condensates of ammonia and ethylene dichloride;
- U.S. Pat. No. 2,926,116 Keim (Hercules);
- U.S. Pat. No. 2,926,154 Keim (Hercules); Polyamide polyamine epichlorohydrin condensates;
- U.S. Pat. No. 3,725,266 Haviland (Haviland Products Co.), Utilization of a precipitation agent and then a centrifugal pump which is used to concentrate metal values and not to process tailings;
- U.S. Pat. No. 3,738,945 Panzer;
- U.S. Pat. No. 3,755,159 Nagy (American Cyanamid), These two patents are illustrative of condensates and polymers derived from a secondary amine (e.g., methylamine) and epichlorohydrin.

FIG. 1 is a view illustrating a preferred method and apparatus for effecting same. Eleven is a dredge equipped with a cutter 12 which passes an aqueous suspension of sand and ore 15 via pipeline 15a to a wet mill 16 which, together with dredge 11, floats on a dredge pond 14. Classifiers 17 aboard the wet mill 16 separate the ilmenite fraction and discard a silica and humate fraction 18. Cationic polymer 18a is preferably fed into the inlet or suction side of a centrifugal pump 19 which leads to pipeline 20 and to the tailings disposal area 22 in a section of the dredge pond remote from the dredge.

Alternatively a separate conveyor line 3 leads to satellite ponds 21 and 21a for reconstitution of dredge pond water.

THE POLYMERIC CATIONIC ORGANIC AMINE TREATING AGENTS

The treating agents of this invention are preferably strongly positively charged condensates of an amine condensed with ethylene dichloride or epichlorohydrin to give water-soluble condensates or polymers of a low molecular weight of about 20,000 to 100,000. A most preferred condensate is epichlorohydrin/dimethylamine (epi-DMA) and an additional preferred condensate is that from ethylene dichloride and ammonia quaternized with methyl chloride. In this process the necessary strong cationic charge to destabilize the colloidal slurry is provided by active sites on a nitrogen and in the above condensate the quaternary salt accentuates the positive charge on the nitrogen. It is believed that destabilization and flocculation are assisted where the cationic additive, by virtue of its opposite charge, overcomes the natural negative-negative repulsion found usually on silica and organic particles.

The preferred condensates or polymers are derived from a mono-amine such as ammonia, methylamine, and dimethylamine, but the amine may also be a polyamine such as ethylene diamine.

The hydrophilic alkylene polyamine polyfunctional halohydrin polymers are reaction products of alkylene polyamines with polyfunctional halohydrins such as dihalohydrine, e.g., alphadichlorohydrin, dibromohydrin, or diiodohydrine, or any of the corresponding monohalohydrins containing a second functional group capable of reacting with an amino nitrogen atom of the alkylene polyamine, such as, for example, epichlorohydrin, epibromohydrin, and the like. These polymers may be considered as cationic materials.

The alkylene polyamines which are reacted with the polyfunctional halohydrins for the purpose of the invention are well-known compounds having the general formula:

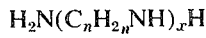

where $n$ is an integer and $x$ is 1 or more. Examples of such alkylene polyamines are the alkylene diamines, such as ethylene diamine, 1,2-propylene diamine, 1,3-propylene diamine, and the polyalkylene polyamines, such as, for example, diethylenetriamine, triethylenetetramine, tetraethylenepentamine, dipropylenetriamine, and the similar polypropylene, polyamines and polybutylene polyamines.

The relative proportions of polyamine and polyfunctional halohydrin employed in making polyamines for the purpose of the invention can be varied depending upon the particular type of polyamine and polyfunctional halohydrin and the reaction condition. In general, it is preferable that the molar ratio of the polyfunctional halohydrin to polyamine be in excess of 1:1 and less than 2:1. Thus, in the preparation of a condensation polymer solution from epichlorohydrin and tetraethylenepentamine, good results have been obtained at a molar ratio of 1.4:1 to 1.94:1.

An additional group of condensates or polymers are those designated as polyamide-polyamine-epi polymers. Such polymers are the reaction product of epichlorohydrin plus a low molecular weight polyamide.

An additional amine treating agent utilizable in this invention is polyethyleneimine utilizable in molecular weights of up to and greater than 100,000.

The above products, which are polymeric cationic organic amines, are known in commerce and their preparations are conventional. For example, a typical preparation for the treating agent consists in reacting the amine with the epoxy or epichlorohydrin in aqueous media under mild heat conditions of about 20°–70°C. until a proper viscosity is reached (at least 100 centistokes) indicating that a polymer has been formed in the desired molecular weight range. See U.S. Pat. No. 3,738,945 Panzer et al. (American Cyanamid), Column 6, line 62, through Column 11, line 67.

It has been found that with a straight-through system where there is no recycling, the dosage of the polymeric cationic organic amine treating agent is in the range of 240–400 ppm. The term "recycling" in the present application denotes a procedure where the tailings slurry is carried to a pile and the water seeps from the pile back to the dredge pond where it started. Where such recycling is utilized, at least a portion of the humate values will be tied up by the polymer so this portion of humate does not exude back to the pond.

Where high speed agitation is utilized and especially where high shear is utilized, the dosage of the treating agent may be reduced to about one-fifth that normally used, and the ppm values for a specific polymeric amine condensate may be reduced to the order of 50–80 ppm.

The amount of cationic treating agent is directly related to the amount of humate present for treatment. It has been found that in the ground itself the amount of humate is approximately 0.5–2.5%. As the deposit is mined, it is formed into a 25% by weight suspension in water. This means that in the aqueous suspension there is about 0.5% maximum of the organic material. However, due to accumulations of organic material in the dredge pond itself by repeated dumping of tailings, the actual humate organic content of the suspension treated in the wet mill is more nearly 4–5%; in other words, more than 20 times as great as it is in the sand deposit itself.

It has been further found that using high speed mixing, the polymeric flocculants were operable in a dosage of 50 ppm based upon the suspension being treated and applied to the pile. Where the humate content may be reduced to a point where it is one percent or less, an effective polymeric treating agent could be utilized in a correspondingly lower amount of the flocculant in the order of 6–12 ppm.

APPLICATION OF CATIONIC POLYMERIC AMINE WITH SHEAR

Beneficial points of introduction for the cationic amine polymeric treating agent have been found to be where there is agitation in mixing the amine with the colloid dispersion. Particularly apt are at the point of initial separation of the ilmenite and tailings and also conveniently just upstream or before the introduction of the mixture into the inlet side of a high vacuum-high pressure centrifugal pump. As to this latter, the pump may be situated at the beginning of a long pipeline where the combination of the agitation in the pipe, coupled with the agitation in the pump, aids and assists to mix and destabilize the colloid composition.

ECOLOGY

In prior treatments without effective flocculation and destabilization of the tailings in the system, all of this organic debris would be eventually condensed and put into one settling pond which would be unusable for an extended period of time ranging from 5 to 8 years. Where a closed system is utilized and the organics are removed and flocculated, there are many ecological advantages. Sand, which is incorporated in the tailings pile, enables the product on the bottom to become hydrophilic rather than hydrophobic and improves the potential for reforestation and revegetation in this tailings area. Another way of thinking is that it serves as a soil rather than in a pond where it has no use. Furthermore, past practices have utilized treatment with aluminum sulfate on the tailings dispersion both to remove color and to flocculate. It was found, however, that this process took a great deal of time and that most of the suspended solids were not flocculated and this water had to be collected for ultimate treatment before releasing to the receiving stream.

Heretofore it has been the practice to operate the mining operation described above without the use of a flocculating agent. While there is no problem in discharging to the tailings pile, a suspension composed largely of the organic humates and silica, it was found that the organic humates, being of colloidal size, would gradually tend to sift through the pile, thereby increasing their concentration in the dredge pond itself. To counteract the resultant increased concentration of organic humates in the dredge pond itself, it was necessary in a separate operation to withdraw from the dredge pond a portion of the dredge pond water to forward it to a settling pond where, with the use of mineral acids, the organic humate content could be removed. It will be understood that from an ecological point of view this system presented numerous difficulties. In the first place, the net result was an effective separation of the organic humate content from the silica sand such that the sand, which was returned to the earth surface, was largely devoid of the humate material, and efforts to restore the land to its original condition, that is, by planting trees and the like, were not entirely satisfactory. Difficulty was encountered because there was insufficient organic material in the sand to support growth and it was too porous to retain ground water. Additionally, of course, it meant that a separate accumulation of the organic material was involved which would serve no useful purpose.

According to the present invention, the introduction of the flocculating agent to the tailings suspension serves to increase the size of the organic humate particles to the point where they are no longer colloidal, hence, no longer will separate from the tailings. Accordingly, they reamin uniformly dispersed throughout the tailings, thereby they serve to promote the reclamation of the soil and, of course, serve to assist in retaining rain water.

However, in the present process, as shown in FIG. 1, the aforementioned disadvantages have been obviated. Furthermore, in a closed system embodying the cationic treating agents, additionally several positive benefits are achieved by comparison with prior processes. For example, in the past, from the standpoint of utilization of water, the continual addition of tailings into a pond reached a point where the excessive solids content made dilution necessary and so water had to be evacuated from the pond, placed elsewhere, and dilution by fresh water made at the original point. This waste of water amounting to a serious ecological dificit has been substantially alleviated since, under the closed cycle or no-exit variation of the present invention, the only water which is added is to replace the water lost due to normal evaporation.

EXAMPLE 1

Destabilization Studies in Pond Water—No Agitation

| Product | Dosage (ppm)[1] | Inches Clear Water[2] |
| --- | --- | --- |
| Polymer A | 226 | 3/4 |

[1]Slurry sample was 1000 ml
[2]After overnight settling (15 hours)

Polymer A has the following analysis:

| | |
| --- | --- |
| Dimethylamine 60 percent | 22.73% |
| Anhydrous Ammonia | .57 |
| Soft Water | 37.33 |
| Epichlorohydrin | 34.27 |
| Hydrochloric Acid 37 percent | 1.96 |
| Caustic Soda | 3.14 |

Additional dosages of Polymer A at ranges from 220–400 ppm showed satisfactory initial clarity with 3 hours settling. The slurry contained 2.58% solids and was from the Highlands Slurry Plant of E. I. du Pont Company.

EXAMPLE 2

Waste Water Treatment—No Agitation

Eight samples of pond water (taken from a stream entering the tailings sump) and eight samples of caustic wash water (taken from concentrate just prior to dry mill) were treated with Polymer B in the following concentrations:

| Sample No. | PPM of Polymer |
| --- | --- |
| 1 | 5 |
| 2 | 10 |
| 3 | 50 |
| 4 | 100 |
| 5 | 200 |
| 6 | 300 |
| 7 | 400 |
| 8 | 500 |

Polymer B has the following analysis:

| | |
| --- | --- |
| Water | 6.15% |
| Versene 100 | 0.21 |
| Anhydrous Ammonia | 6.24 |
| Ethylene Dichloride | 24.00 |
| Caustic Soda Liquid 50 percent | 47.79 |
| Methyl Chloride | 15.61 |

The samples above were made by addition of 0.1% solution of polymer to the waste water. All 16 samples were allowed to stand for 24 hours. Results were as follows:

TABLE I

| Sample No. | pH | Result | Sample No. | pH | Result |
| --- | --- | --- | --- | --- | --- |
| 1 | 6.5 | No flocculation | 1 | 6.8 | No flocculation |
| 2 | 6.5 | " | 2 | 6.8 | " |
| 3 | 6.5 | " | 3 | 6.8 | " |
| 4 | 6.5 | " | 4 | 6.8 | " |
| 5 | 6.5 | Flocculation, but no settling | 5 | 6.7 | " |
| 6 | 6.5 | Settling, clear supernate | 6 | 6.7 | Flocculation, but no settling |
| 7 | 6.4 | Settling, very clear supernate | 7 | 6.7 | " |
| 8 | 6.4 | Settling, turbid supernate (over-treated) | 8 | 6.7 | Se g, clear rnate |

TABLE II

| Sample No. | Coagulant | Treatment Level (ppm) | Volume % Settling |
|---|---|---|---|
| 1 | Polymer B+ | 105 | 0.0 |
| 2 | Polymer B | 105 | 66.0 |
| 3 | Polymer B | 105 | 66.0 |
| 4 | Polymer B | 189 | 68.0 |
| 5 | Polymer B | 189 | 66.0 |
| 6 | Polymer B | 189 | 64.0 |
| 7 | Polymer B | 287 | 64.0 |
| 8 | Polymer B | 287 | 64.0 |
| 9 | Polymer B | 287 | 40.0 |
| 10 | Polymer B | 418 | 38.0 |
| 11 | Polymer B | 418 | 40.0 |
| 12 | Polymer B | 418 | 31.0 |
| 13 | Polymer B | 198 | 42.0 |
| 14 | Polymer B | 198 | 0.0* |
| 15 | Polymer B | 198 | 0.0* |
| 16 | Polymer B | 310 | 0.0* |
| 17 | Polymer B | 310 | 38.0 |
| 18 | Polymer B | 310 | 38.0 |
| 19 | Polymer A++ | 72 | 38.0 |
| 20 | Polymer A | 72 | 25.0 |
| 21 | Polymer A | 94 | 38.0 |
| 22 | Polymer A | 94 | 32.0 |
| 23 | Polymer A | 172 | 32.0 |
| 24 | Polymer A | 172 | 38.0 |
| 25 | Polymer A | 27 | 22.0 |
| 26 | Polymer A | 27 | 34.0 |
| 27 | Polymer A | 27 | 35.0 |
| 28 | Polymer A | 41 | 34.0 |
| 29 | Polymer A | 41 | 35.0 |
| 30 | Polymer A | 41 | 34.0 |
| 31 | Polymer A | 68 | 34.0 |
| 32 | Polymer A | 68 | 27.0 |
| 33 | Polymer A | 68 | 30.0 |
| 34 | Polymer A | 73 | 27.0 |
| 35 | Polymer A | 73 | 27.0 |
| 36 | Polymer A | 73 | 25.0 |

+See Polymer B in Example 2
++See Polymer A in Example 1
*Samples disturbed

The sample of pond water containing 400 ppm of Polymer B was found to contain 55 cc of settled organic solids. When dried, these solids were found to weigh 0.73 grams.

EXAMPLE 3

In the Fall 1973 the Trail Ridge Plant, E. I. du Pont Company, Starke, Fla., showed the values in Table II. In this case the effluent or tailings mixed with polymer was transferred to a satellite pond and ppm metering of polymer was made at a metering station near the suction side of a centrifugal pump.

EXAMPLE 4

In an on-stream test 50 ppm of Polymer A was introduced into the suction or input side of a centrifugal pump and mixed with the tailings flow from the wet mill at the E. I. du Pont Highlands Plant, Starke, Florida. This tailings flow was then routed around the side of the mining area and delivered at the upper end of the tailings pile. At the immediate discharge of the tailings to the pile, the slurry was sampled and observed to flocculate and to settle. In addition, the sides of the tailings pile were observed and we noted that organics and sand had settled in this area. It was believed that continued use of this material in this way would result in a decrease in the total solids in the pond water. Present pond water values are approximately 4 percent. A decrease to the neighborhood of 1-2% solids in the pond still would result in improvement of the wet mill itself and corresponding benefits to the operators. The tailings pump itself, which is supplying severe agitation to the slurry of tailings in Polymer A was a large 12,000 gpm centrifugal pump powered by approximately a 200 h.p. motor. The Reynolds numbers in the pipeline going to the top of the tailings pile are estimated to be in excess of $10^6$. It is believed that this severe agitation, shear and continued excessively turbulent flow improved the mixing of Polymer A with the tailings slurry and resulted in improved flocculation and reduced dosages.

RESULTS

The experimental results of Examples 1-4 indicate that the dosage for the preferred additive may be within rather wide ranges from 6-400 ppm depending upon the degree of agitation and other subsidiary factors such as agitation in the necessary conveying lines, humate content, etc.

What is claimed is:

1. In a process for the recovery of ilmenite from ancient beach sands by dredge ground level mining wherein the sands are classified in a wet mill to produce an ilmenite concentrate and a tailings stream, said tailings stream consisting of a dispersion of water, colloidal humate and silica the improvement comprising adding to said tailings stream dispersion with an effective amount of high speed agitation a water-soluble polymeric cationic amine of molecular weight of about 20,000 to 100,000 in an effective amount of about 6-400 ppm to cause the flocculation of said humate and retention in the tailings.

2. The method of claim 1 wherein the polymeric cationic amine is a condensate of epichlorohydrin/-dimethylamine.

3. The method of claim 1 wherein the polymeric cationic amine is a condensate of ethylene dichloride/ammonia quaternized with methyl chloride.

* * * * *

UNITED STATES PATENT OFFICE
CERTIFICATE OF CORRECTION

Patent No. 3,917,529　　　　　　　　　Dated November 4, 1975

Inventor(s) JIM M. MADOLE and RICHARD F. ABLES

It is certified that error appears in the above-identified patent and that said Letters Patent are hereby corrected as shown below:

SHOW ASSIGNEE AS:

NALCO CHEMICAL COMPANY, OAK BROOK, ILLINOIS and

E. I. DU PONT DE NEMOURS & CO., WILMINGTON, DELAWARE

Signed and Sealed this sixth Day of April 1976

[SEAL]

Attest:

RUTH C. MASON　　　　　　　　　　C. MARSHALL DANN
*Attesting Officer*　　　　　　　　*Commissioner of Patents and Trademarks*